United States Patent
Kameshima

(10) Patent No.: US 9,678,221 B2
(45) Date of Patent: Jun. 13, 2017

(54) RADIATION DETECTING ELEMENT, RADIATION DETECTING APPARATUS AND MANUFACTURING METHOD OF RADIATION DETECTING ELEMENT

(71) Applicant: RIKEN, Saitama (JP)

(72) Inventor: Takashi Kameshima, Hyogo (JP)

(73) Assignee: RIKEN, Saitama (JP)

( * ) Notice: Subject to any disclaimer, the term of this patent is extended or adjusted under 35 U.S.C. 154(b) by 0 days.

(21) Appl. No.: 14/838,316

(22) Filed: Aug. 27, 2015

(65) Prior Publication Data
US 2016/0061963 A1    Mar. 3, 2016

(30) Foreign Application Priority Data
Aug. 27, 2014   (JP) .................................. 2014-172299

(51) Int. Cl.
*G01T 1/20*    (2006.01)
*G21K 4/00*    (2006.01)

(52) U.S. Cl.
CPC ............ *G01T 1/20* (2013.01); *G21K 2004/08* (2013.01); *G21K 2004/12* (2013.01)

(58) Field of Classification Search
CPC ... G01T 1/20; G21K 2004/08; G21K 2004/12
See application file for complete search history.

(56) References Cited

U.S. PATENT DOCUMENTS

| | | | | |
|---|---|---|---|---|
| 4,663,187 A | * | 5/1987 | Persyk | G01T 1/202 423/463 |
| 5,332,906 A | * | 7/1994 | Lauf | G01T 1/202 250/361 R |
| 5,786,599 A | * | 7/1998 | Rogers | G01T 1/2002 250/368 |
| 7,135,686 B1 | * | 11/2006 | Grady | G01T 1/2018 250/370.11 |
| 7,800,072 B2 | * | 9/2010 | Yun | G01T 1/2002 250/370.11 |
| 2011/0017916 A1 | * | 1/2011 | Schulz | G01T 1/2002 250/368 |

(Continued)

FOREIGN PATENT DOCUMENTS

JP    2012-026821 A    2/2012

OTHER PUBLICATIONS

H. Yagi et al., "Highly Efficient Flashlamp-Pumped Cr3+ and Nd3+ Codoped Y3Al5O12 Ceramic Laser," Jpn. J. Appl. Phys., vol. 45, No. 1A, 2006, pp. 133-135.

(Continued)

*Primary Examiner* — Christine Sung

(57) ABSTRACT

When a scintillator and a reinforcing member are bonded by using an adhesive, scattering and reflection occur at interfaces between the scintillator and the adhesive and between the adhesive and the reinforcing member. Due to this, a blurred image is formed on a sensor, and the resolution deteriorates. A radiation detecting element comprises: a substrate transparent to visible light; and a fluorescent screen that emits fluorescence in response to radiation by a dopant added to a material that is the same as a material of the substrate, wherein the fluorescent screen is thinner than the substrate, and the substrate and the fluorescent screen are bonded while maintaining continuity of a refractive index.

4 Claims, 5 Drawing Sheets

(56) References Cited

U.S. PATENT DOCUMENTS

2011/0155917 A1* 6/2011 Nomura .................... G01T 1/20
250/370.08

OTHER PUBLICATIONS

H. Yagi et al., "Side-Pumped Nd3+:Y3AI5O12 Composite Ceramic Laser," Jpn. J. Appl. Phys., vol. 45, No. 7, 2006, pp. L207-L209.
H. Yagi et al., "The Physical Properties of Composite YAG Ceramics," Laser Physics, vol. 15, No. 9, 2005, pp. 1338-1344.
T. Martin and A. Koch, "Recent developments in X-ray imaging with micrometer spatial resolution," J. Synchrotron Rad., 2006. 13, pp. 180-194.
H. Graafsma and T. Martin, "Detectors for synchrotron tomography," pp. 277-302.

* cited by examiner

RADIATION DETECTING ELEMENT, RADIATION DETECTING APPARATUS AND MANUFACTURING METHOD OF RADIATION DETECTING ELEMENT

The contents of the following Japanese patent application are incorporated herein by reference:
  No. 2014-172299 filed on Aug. 27, 2014.

BACKGROUND

1. Technical Field

The present invention relates to a radiation detecting element, a radiation detecting apparatus, and a manufacturing method of a radiation detecting element.

2. Related Art

It has been known that a scintillator of a measuring apparatus to measure radiation is made thin while maintaining the strength of the scintillator by bonding the scintillator and a transparent reinforcing member with an adhesive to make them thin, as described for example in Japanese Patent Application Publication No. 2012-26821.

However, when a scintillator and a reinforcing member are bonded by using an adhesive, scattering and reflection occur at interfaces between the scintillator and the adhesive and between the adhesive and the reinforcing member. Due to this, a blurred image is formed on a sensor, and the resolution deteriorates.

SUMMARY

According to a first aspect of the present invention, a radiation detecting element comprises: a substrate transparent to visible light; and a fluorescent screen that emits fluorescence in response to radiation by a dopant added to a material that is the same as a material of the substrate, wherein the fluorescent screen is thinner than the substrate, and the substrate and the fluorescent screen are bonded while maintaining continuity of a refractive index.

According to a second aspect of the present invention, a radiation detecting apparatus comprises: a radiation detecting element having a substrate transparent to visible light, and a fluorescent screen that emits fluorescence in response to radiation by a dopant added to a material that is the same as a material of the substrate, wherein the fluorescent screen is thinner than the substrate, and the substrate and the fluorescent screen are bonded while maintaining continuity of a refractive index; an imaging optical system that forms an image of fluorescence emitted by the fluorescent screen; and a photoelectric conversion element on which photoelectric conversion pixels that perform photoelectric conversion on fluorescence an image of which has been formed are disposed two-dimensionally.

According to a third aspect of the present invention, a manufacturing method of a radiation detecting element comprises: bonding, by solid state diffusion, a substrate transparent to visible light and a fluorescent screen that emits fluorescence in response to radiation by a dopant added to a material that is the same as a material of the substrate; and thinning the fluorescent screen.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
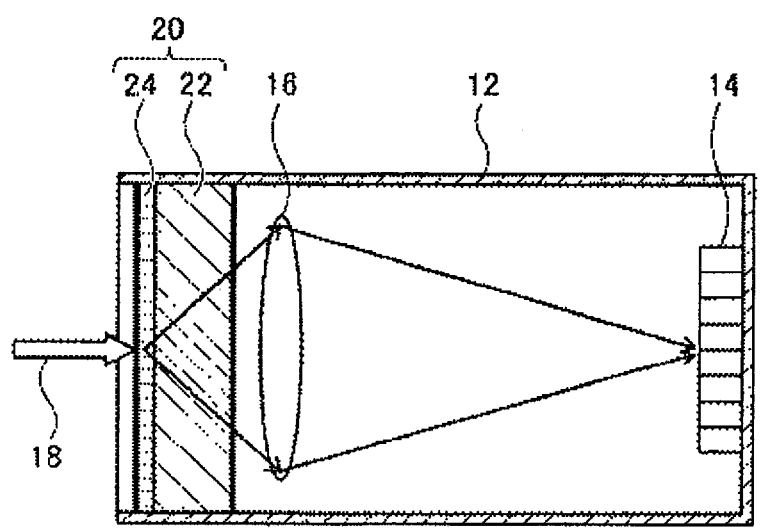
FIG. 1 is a schematic cross-sectional view of a radiation detecting apparatus 10.

FIG. 1 is a schematic cross-sectional view of a radiation detecting apparatus 10. The radiation detecting apparatus 10 is an indirect conversion-type two-dimensional radiation detector to measure a two-dimensional signal of a high energy radiation such as an X-ray by converting it into low energy fluorescence. One example of radiation is an X-ray free electron laser (hereinafter, called an XFEL in some cases). The radiation detecting apparatus 10 has a cylindrical housing 12, a CCD sensor 14, an objective lens 16 and a radiation detecting element 20.

The radiation detecting element 20 is circular plate-like, and is disposed on one end surface side of the housing 12. The radiation detecting element 20 contains a fluorescent substance, and converts a high energy radiation that enters from the direction indicated with an arrow 18 into numerous low energy fluorescence lines. The radiation detecting element 20 makes detection by the CCD sensor 14 possible by converting radiation at a frequency that is outside the region of sensitivity and therefore cannot be detected by the CCD sensor 14 into fluorescence at a frequency that is within the region of sensitivity. It should be noted that the shape of the radiation detecting element 20 is not limited to a circle, but may be any shape such as a square.

The CCD sensor 14 has photoelectric conversion pixels that are disposed two-dimensionally. The CCD sensor 14 converts light in the region of sensitivity including visible light the image of which has been formed by the objective lens 16 into an electrical signal and outputs it. The CCD sensor 14 is disposed on another end surface side of the housing 12 so that the surface on which the photoelectric conversion pixels are disposed faces the radiation detecting element 20. The CCD sensor 14 is one example of a photoelectric conversion element, and an EMCCD sensor or a CMOS sensor may be used in place of the CCD sensor 14. Because in an EMCCD sensor, a function of multiplying electrons is added to a readout unit of the CCD sensor, faint light can be measured highly sensitively by using the EMCCD sensor. Because a CMOS sensor adopts a highspeed readout system, light can be measured at a high frame rate by using the CMOS sensor.

The objective lens 16 is disposed between the radiation detecting element 20 and the CCD sensor 14 so that the objective lens 16, the radiation detecting element 20 and the CCD sensor 14 are on a straight line. Furthermore, preferably, the CCD sensor 14, the radiation detecting element 20 and the objective lens 16 are disposed so that the center of the surface of the CCD sensor 14 on which the photoelectric conversion pixels are disposed and the center of the radiation detecting element 20 match the optical center of the objective lens 16.

The objective lens 16 forms an image of fluorescence emitted from the radiation detecting element 20 on the surface of the CCD sensor 14 on which the photoelectric conversion pixels are disposed. The objective lens 16 may be configured with a single lens, or may be configured with a plurality of lenses including an objective lens and an imaging lens. It should be noted that the objective lens 16 is one example of an imaging optical system.

Figure 2:
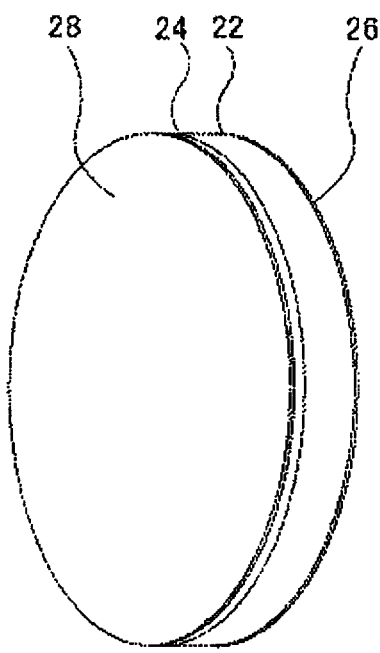
FIG. 2 is a schematic perspective view of a radiation detecting element 20.

FIG. 2 is a schematic perspective view of the radiation detecting element 20. The radiation detecting element 20 has a substrate 22, a fluorescent screen 24 and anti-reflection films 26, 28.

The substrate 22 is disposed on the objective lens 16 side of the radiation detecting element 20. The transmittance of fluorescence which is visible light for the substrate 22 is higher and the fluorescence is more transparent than radiation whereas the transmittance of radiation for the substrate 22 is lower than visible light. The substrate 22 is configured by $Y_3Al_5O_{12}$ (hereinafter, called YAG). It should be noted that YAG is one example of a material to configure a substrate, and any other materials including $Lu_2SiO_5$, $LuYSiO_5$, $LuYSiO_5$, $Gd_3Ga_5O_{12}$, $CdWO_4$, $Bi_4Ge_3O_{12}$, $Gd_2SiO_5$, $Gd_2O_2S$, $Y_2SiO_5$, $Yb_2SiO_5$, $LuAlO_3$, $Lu_3Al_5O_{12}$, $Gd_3Al_2Ga_3O_{12}$, $Lu_{0.7}Y_{0.3}AlO_3$, or a mixture thereof may be used.

The fluorescent screen 24 is disposed on a side of the radiation detecting element 20 where radiation enters. The fluorescent screen 24 emits fluorescence corresponding to radiation by adding a dopant, Ce, to YAG which is a material same as the material of the substrate 22. That is, the fluorescent screen 24 functions as a scintillator that emits fluorescence corresponding to radiation that has entered there. It should be noted that, in the present embodiment, YAG to which Ce has been added emits fluorescence whose wavelength centers at 550 nm. Also, Ce is one example of a dopant to be added to the fluorescent screen 24, and as other dopants, Mn, Tl, Sn, Pb, Eu, Tb, La, Gd, Al, Ge, Yb, Nd, Sm, Er, Tm, Am or Pr may be used.

The thickness of the substrate 22 needs to have the proportion so that while the handling strength is maintained, radiation that is transmitted through the fluorescent screen 24 gets attenuated and extinguished. Also, in order to suppress spherical aberration occurring in the substrate 22, it is preferred to make the thickness of the substrate 22 thin. In the present embodiment, the thickness of the substrate 22 is 3 mm for example.

On the other hand, the thickness of the fluorescent screen 24 is smaller than the thickness of the substrate 22, and is preferably within the range of 1 μm to 2 mm. In the present embodiment, the thickness of the fluorescent screen 24 is 20 μm for example. By making the fluorescent screen 24 thin, scattering of light-emission points of fluorescence in the traveling direction of radiation can be prevented; as a result, the spatial resolution of the radiation detecting apparatus 10 improves. However, the spatial resolution of the radiation detecting apparatus 10 does not improve to be equal to or exceed the resolution that is determined by the diffraction limit determined by fluorescence wavelength and the numerical aperture of the objective lens 16 and the pixel size and optical magnification of the CCD sensor 14. For this reason, in a case where the highest spatial resolution of the radiation detecting apparatus 10 is to be obtained, preferably, the objective lens 16 having high optical magnification so that the pixel size of the CCD sensor 14 becomes smaller than the diffraction limit size of fluorescence is used, and the thickness of the fluorescent screen 24 is selected so that it becomes the depth of focus determined by the diffraction limit of fluorescence. Furthermore, the thickness of the fluorescent screen 24 is determined considering that the target viewing field, spatial resolution, and amount of emitted light of fluorescence can be ensured, and that a region to which a fluorescent substance, Ce, is added can be ensured on the entire surface of the fluorescent screen 24 even when the fluorescent screen 24 is bonded with the substrate 22 by solid state diffusion.

The fluorescent screen 24 and the substrate 22 are bonded while maintaining continuity of the refractive index. Here, bonding while maintaining continuity of the refractive index means that the refractive index structure of an interface where the fluorescent screen 24 and the substrate 22 are bonded is substantially uniform. For example, when the difference between the refractive index of the substrate 22 configured by YAG and the refractive index of the fluorescent screen 24 in which Ce is added to YAG is on the order of 0.1%, and the substrate 22 and the fluorescent screen 24 are bonded, the refractive index structure of the bonding interface can be said to be uniform. By making the refractive index structure of the interface where the fluorescent screen 24 and the substrate 22 are bonded substantially uniform, scattering, refraction and reflection of fluorescence at the bonding interface can be prevented.

The anti-reflection film 26 and the anti-reflection film 28 are disposed on both end faces of the bonded substrate 22 and fluorescent screen 24, respectively. The anti-reflection film 26 is disposed on a surface of the substrate 22 that is opposite to the surface of the substrate 22 that is bonded with the fluorescent screen 24. The anti-reflection film 26 prevents reflection of fluorescence emitted from the fluorescent screen 24. The anti-reflection film 26 is a thin film having the thickness equivalent to ¼ of the wavelength of fluorescence for example. In the present embodiment, because the wavelength of fluorescence of YAG to which Ce is added is 550 nm, the anti-reflection film 26 is a thin film of 137.5-nm thickness which is equivalent to ¼ of 550 nm. The anti-reflection film 26 prevents reflection of fluorescence by cancelling out light reflected on the interface between the substrate 22 and the anti-reflection film 26 by means of light reflected on the front surface of the anti-reflection film 26. Also, a multi-layered film on which two or more layers of dielectric films are coated may be used as the anti-reflection film 26.

The anti-reflection film 28 is disposed on a surface of the fluorescent screen 24 that is opposite to the surface of the fluorescent screen 24 that is bonded with the substrate 22. The anti-reflection film 28 prevents reflection of fluorescence emitted from the fluorescent screen 24 and re-reflection of reflected light of fluorescence that occurs on the surface of the substrate 22 that is opposite to the surface of the substrate 22 that is bonded with the fluorescent screen 24. It should be noted that because the configuration of the anti-reflection film 28 is the same as that of the anti-reflection film 26, explanation of the configuration of the anti-reflection film 28 is omitted.

Figure 3A:
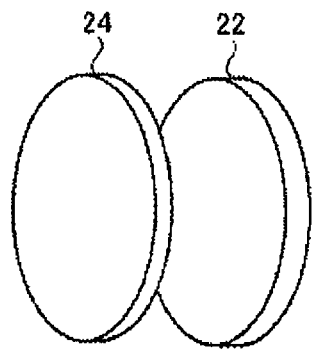
FIGS. 3A to 3D are figures for explaining a manufacturing method of the radiation detecting element 20.

FIGS. 3A to 3D are figures for explaining a manufacturing method of the radiation detecting element 20. FIG. 3A shows a step where the substrate 22 and the fluorescent screen 24 are prepared for respectively. In this state, for example, the thickness of the substrate 22 is 3 mm, and the thickness of the fluorescent screen 24 is 1 mm. It should be noted that the thicknesses of the substrate 22 and the fluorescent screen 24 before bonding may be determined as appropriate considering easiness of handling or the like.

Figure 3B:
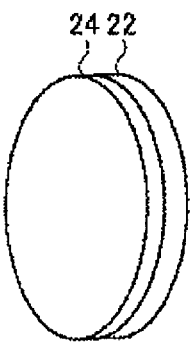

FIG. 3B shows a step where the substrate 22 and the fluorescent screen 24 are bonded by solid state diffusion. The bonding surface of the substrate 22 is superposed on the bonding surface of the fluorescent screen 24, and bonded by solid state diffusion. It should be noted that, before superposing the substrate 22 and the fluorescent screen 24, the surface of the substrate 22 on which it is bonded with the fluorescent screen 24 may be polished and smoothed. Similarly, the surface of the fluorescent screen 24 on which it is bonded with the substrate 22 may be polished and smoothed. By smoothing the bonding surfaces, the contact area of the substrate 22 and the fluorescent screen 24 can be increased. Thereby, the reliability of solid state diffusion bonding can be improved.

Also, before superposing the substrate 22 and the fluorescent screen 24, the surface of the substrate 22 on which it is bonded with the fluorescent screen 24 may be washed. Similarly, the surface of the fluorescent screen 24 on which it is bonded with the substrate 22 may be washed. In solid state diffusion bonding, if the bonding surfaces of the substrate 22 and the fluorescent screen 24 are contaminated, diffusion of respective atoms does not proceed on the contaminated part, and the bonding strength of solid state diffusion bonding becomes low. By washing the bonding surfaces, contamination can be removed, thereby improving the reliability of solid state diffusion bonding.

Also, in solid state diffusion bonding, pressure may be applied in the bonding directions of the substrate 22 and the fluorescent screen 24, respectively. By applying pressure in the bonding directions of the substrate 22 and the fluorescent screen 24, the interfaces of the substrate 22 and the fluorescent screen 24 can be closely adhered to each other. Thereby, the reliability of solid state diffusion bonding can be improved.

Furthermore, in solid state diffusion bonding, the substrate 22 and the fluorescent screen 24 may be heated. By heating the substrate 22 and the fluorescent screen 24, diffusion of atoms of the substrate 22 and atoms of the fluorescent screen 24 at the bonding surfaces is enhanced. Thereby, the bonding strength of solid state diffusion bonding can be improved.

Figure 3C:
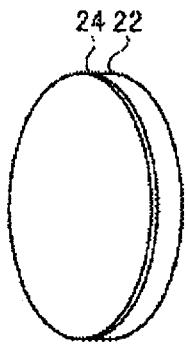

FIG. 3C shows a state where the fluorescent screen 24 is polished and thinned. The fluorescent screen 24 is polished and thinned from a surface on a side on which the substrate 22 is not bonded. It should be noted that polishing is performed for example by chemical mechanical polishing (hereinafter, called CMP in some cases), and the fluorescent screen 24 of 1-mm thickness is thinned to 20 µm. It should be noted that the thickness of the fluorescent screen 24 may be 4 µm, 2 µm, or 1 µm. Also, polishing may be mechanical polishing such as machining. Because the fluorescent screen 24 is reinforced by being bonded with the substrate 22 of 3-mm thickness, the fluorescent screen 24 can be thinned to the thickness of 1 µm without damaging the fluorescent screen 24. Also, in this manner, by thinning the fluorescent screen 24 from the side where radiation enters by CMP, the surface of the fluorescent screen 24 on the side where radiation enters can be flattened highly accurately.

Figure 3D:
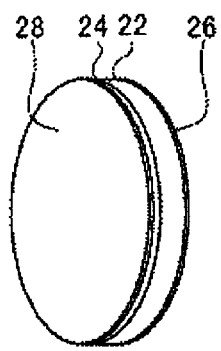

FIG. 3D shows a step where the anti-reflection film 26 and the anti-reflection film 28 are provided to both end faces of the bonded fluorescent screen 24 and substrate 22. As described above, the anti-reflection film 26 is disposed on the side surface of the substrate 22 on the surface of the side on which the fluorescent screen 24 is not provided. Also, the anti-reflection film 28 is disposed on the side surface of the fluorescent screen 24 on the surface of the side on which the substrate 22 is not provided. The anti-reflection film 26 and the anti-reflection film 28 are disposed on the respective surfaces for example due to vacuum deposition.

Figure 4:
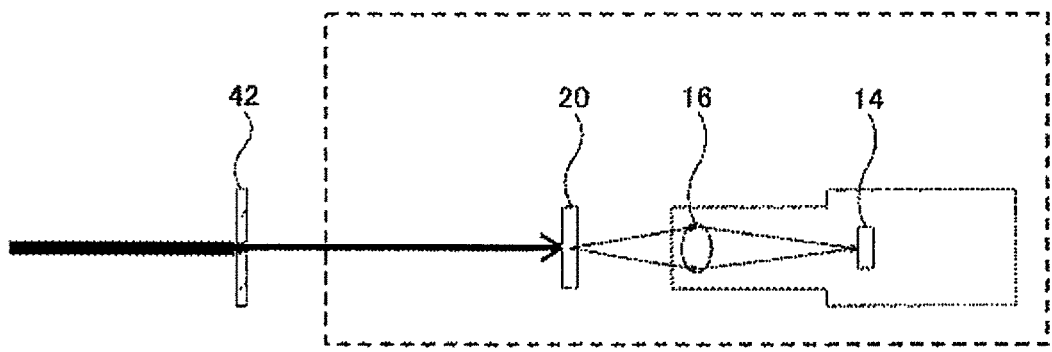
FIG. 4 is a schematic cross-sectional view of a spatial resolution measuring apparatus 40.

FIG. 4 is a schematic cross-sectional view of a spatial resolution measuring apparatus 40. The spatial resolution of the radiation detecting element 20 according to the present embodiment is explained by using FIG. 4. The spatial resolution measuring apparatus 40 has a pinhole plate 42 to which a φ10-µm pinhole is provided, the radiation detecting element 20, the objective lens 16 and the CCD sensor 14. It should be noted that in FIG. 4, elements that are the same as those shown in FIG. 1 are provided with the same reference numerals, and overlapping explanation is omitted.

For measurement of the spatial resolution, first, an XFEL was allowed to pass through the φ10 µm pinhole provided to the pinhole plate 42. Thereby, the XFEL that entered the radiation detecting element 20 was cut into φ10 µm.

Next, the XFEL cut into φ10 µm was entered into the radiation detecting element 20, and fluorescence was emitted. An image of the fluorescence emitted from the radiation detecting element 20 was formed in the CCD sensor 14 by using the objective lens 16. Thereby, the profile of a point spread function of the fluorescence the image of which was formed by the objective lens 16 was acquired from the CCD sensor 14.

Next, the profile of a point spread function of the XFEL cut into φ10 µm at the position of the radiation detecting element 20 was acquired. Then, the profile of the point spread function of the XFEL cut into φ10 µm at the position of the radiation detecting element 20 was deconvoluted from the profile of the point spread function acquired from the CCD sensor 14, and thus the spatial resolution of the optical system configured by the radiation detecting element 20 and the objective lens 16 was calculated.

Figure 5:
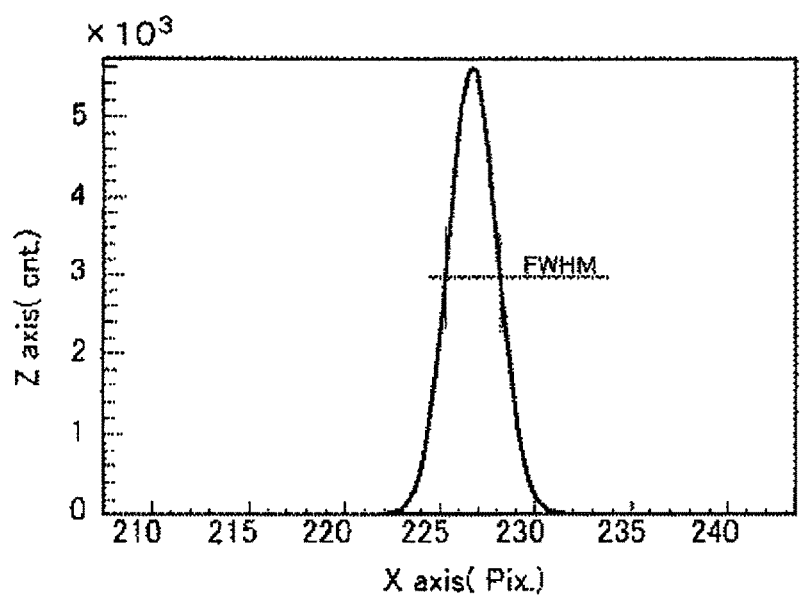
FIG. 5 shows a profile of a point spread function of fluorescence acquired from a CCD sensor 14.

FIG. 5 shows the profile of the point spread function of fluorescence acquired from the CCD sensor 14. The vertical axis in FIG. 5 indicates the numbers of counts of received fluorescence, and the horizontal axis indicates pixel positions where the received fluorescence was received. The half-value width calculated from the profile of the point spread function acquired from the CCD sensor 14 was 12 µm. The half-value width calculated from the profile of the point spread function the XFEL cut into φ10 µm at the position of the radiation detecting element 20 was 9 µm.

Here, the profile of the point spread function acquired from the CCD sensor 14 is assumed to be A and its half-value width is assumed to be a. Also, the profile of the point spread function of the XFEL cut into φ10 µm at the position of the radiation detecting element 20 is assumed to be B, and its half-value width is assumed to be b. Also, the profile of the point spread function from the radiation detecting element 20 to the CCD sensor 14 is assumed to be C, and its half-value width is assumed to be c. Then, because the profile A is a profile obtained by convolution of the profile B and the profile C, the following relational expression (1) is established when these profiles are deconvoluted and they are respectively expressed with the half-value widths of the profiles.

$$a=[(b)^2+(c)^2]^{1/2} \quad (1)$$

By using the relational expression (1) and substituting 12 for a and 9 for b to calculate the half-value width c, the half-value width c=7.9 is obtained. Thereby, it can be known that the spatial resolution from the radiation detecting element 20 to the CCD sensor 14 is about 8 μm in terms of a half-value width.

Also, even when measurement of spatial resolution was performed for about six hours by using the spatial resolution measuring apparatus 40, there was no malfunction of the CCD sensor 14. This indicates that the XFEL was attenuated by the substrate 22 and the XFEL did not reach the CCD sensor 14. It should be noted that if an XFEL reaches the CCD sensor 14, malfunction that the XFEL destroys the photoelectric conversion elements and the operation of the CCD sensor 14 stops or dark current of the CCD sensor 14 increases and noise increases occurs.

Figure 6:
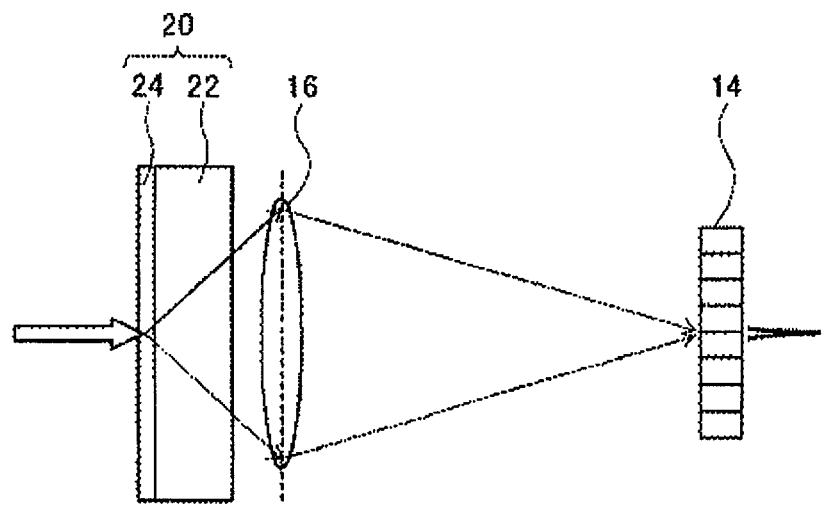
FIG. 6 is a schematic diagram of a part that detects radiation in the radiation detecting apparatus 10.

FIG. 6 is a schematic diagram of a part that detects radiation in the radiation detecting apparatus 10. Effects of the radiation detecting apparatus 10 and the radiation detecting element 20 according to the present embodiment are explained by using FIG. 6. It should be noted that in FIG. 6, elements that are the same as those shown in FIG. 1 are provided with the same reference numerals, and overlapping explanation is omitted.

In the present embodiment, the substrate 22 and the fluorescent screen 24 in the radiation detecting element 20 are configured by the same material, YAG. Furthermore, because the substrate 22 and the fluorescent screen 24 are bonded while maintaining continuity of the refractive index, fluorescence emitted from the fluorescent screen 24 is not refracted at the interface between the substrate 22 and the fluorescent screen 24. If it is supposed that fluorescence is refracted at the interface between the substrate 22 and the fluorescent screen 24, the refracted fluorescence is not focused on the CCD sensor 14 by the objective lens 16 due to the influence of spherical aberration. Accordingly, by bonding the interface between the substrate 22 and the fluorescent screen 24 while maintaining continuity of the refractive index, refraction of fluorescence at the bonding interface can be prevented, thereby improving resolution of an image formed on the CCD sensor 14 by the objective lens 16.

Also, by bonding the substrate 22 and the fluorescent screen 24 while maintaining continuity of the refractive index, fluorescence emitted from the fluorescent screen 24 can also be prevented from being reflected at the bonding interface between the fluorescent screen 24 and the substrate 22. If fluorescence is reflected at the interface, the light amount of an image formed on the CCD sensor 14 by the objective lens 16 decreases. Accordingly, the light amount of an image formed on the CCD sensor 14 can be increased by suppressing reflection at the interface, and the sensitivity of the radiation detecting apparatus 10 can be increased.

Also, if fluorescence is reflected at the bonding interface between the fluorescent screen 24 and the substrate 22, the resolution of the radiation detecting apparatus deteriorates. Deterioration of the resolution of the radiation detecting apparatus due to the reflection is explained by using FIG. 7.

Figure 7:
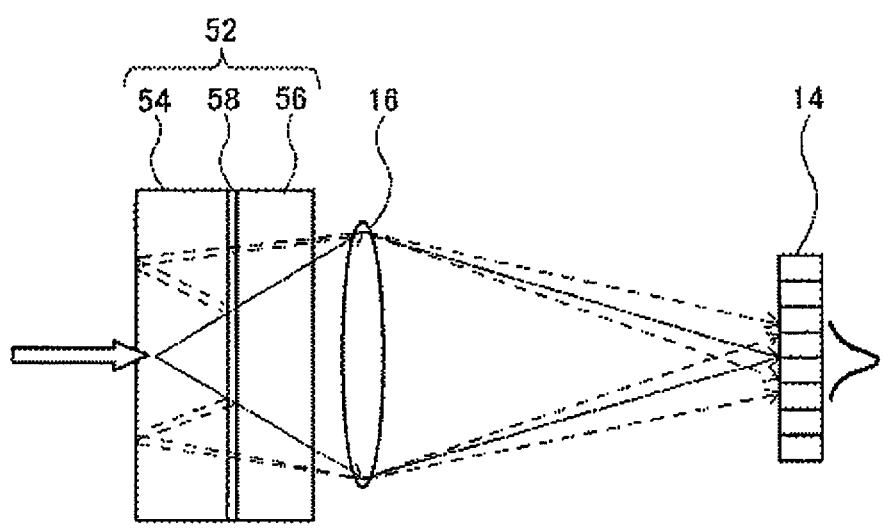
FIG. 7 is a schematic diagram of a part that detects radiation in a radiation detecting apparatus 50 which is a comparative example.

FIG. 7 is a schematic diagram of a part that detects radiation in a radiation detecting apparatus 50 according to a comparative example. The radiation detecting apparatus 50 has a radiation detecting element 52, the objective lens 16 and the CCD sensor 14. Also, the radiation detecting element 52 is configured by bonding a fluorescent screen 54 and a substrate 56 by an adhesive 58. Differences between the radiation detecting apparatus 50 and the radiation detecting apparatus 10 shown in FIG. 1 are that the radiation detecting element 52 is configured by gluing the fluorescent screen 54 and the substrate 56 with the adhesive 58, the thickness of the fluorescent screen 54 is thick, and the anti-reflection films 26, 28 are not provided.

Generally, the refractive index of the adhesive 58 is different from the refractive index of the fluorescent screen 54 and the refractive index of the substrate 56. When the refractive index of the adhesive 58 is different from the refractive index of the fluorescent screen 54, fluorescence is reflected due to the change in the refractive index at the interface between the fluorescent screen 54 and the adhesive 58. Similarly, when the refractive index of the adhesive 58 is different from the refractive index of the substrate 56, fluorescence is reflected due to the change in the refractive index at the interface between the adhesive 58 and the substrate 56.

The reflected light is further reflected on the front surface of the fluorescent screen 54, and enters the objective lens 16. Because the reflected light that has entered the objective lens 16 is not focused on the CCD sensor 14, components that are not focused on the CCD sensor 14 are mixed in an image formed on the CCD sensor 14, and the resolution of the image formed on the CCD sensor 14 deteriorates. The reflected light repeats reflection at constant reflectance at each of the interface between the fluorescent screen 54 and the air, the interface between the fluorescent screen 54 and the adhesive 58, the interface between the adhesive 58 and the substrate 56, and the interface between the substrate 56 and the air, and spreads in directions that are vertical to the optical axis. Components that are transmitted through the interface between the substrate 56 and the air in this process enter the objective lens 16. Because fluorescent components that repeated the reflection and have entered the objective lens 16 are not focused on the CCD sensor 14, components that are not focused on the CCD sensor 14 are mixed in an image formed on the CCD sensor 14, and the resolution of the image formed on the CCD sensor 14 deteriorates.

On the other hand, because in the radiation detecting element 20 according to the present embodiment, the substrate 22 and the fluorescent screen 24 are bonded by solid state diffusion, the refractive index does not change at the interface between the substrate 22 and the fluorescent screen 24. Thereby, mixing of components that are not focused on the CCD sensor 14 can be prevented, and the resolution of an image formed on the CCD sensor 14 by the objective lens 16 can be prevented from deteriorating.

Figure 8:
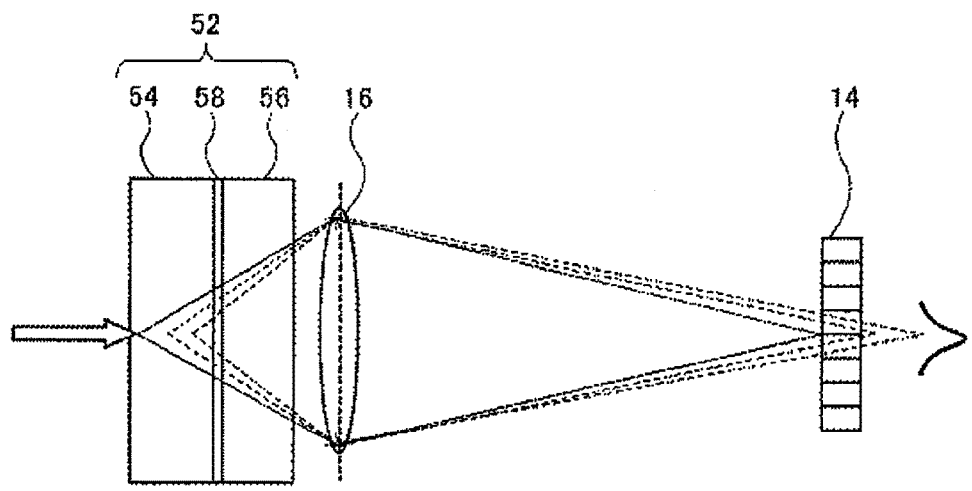
FIG. 8 is a schematic diagram for explaining a light-emission position of fluorescence in the radiation detecting apparatus 50 in FIG. 7.

FIG. 8 is a schematic diagram for explaining a light-emission position of fluorescence in the radiation detecting apparatus 50 in FIG. 7. When radiation enters the fluorescent screen 54, fluorescence is emitted from a plurality of positions that are displaced in the thickness direction of the fluorescent screen 54. Images of the fluorescence emitted from the plurality of positions displaced in the thickness direction are formed by the objective lens 16 at different positions. Accordingly, by adjusting the position of the objective lens 16 so that an image of fluorescence emitted from a certain position from among the fluorescence emitted from the plurality of positions is formed on the CCD sensor 14, fluorescence emitted from other positions become components that are not focused on the CCD sensor 14, and the resolution of an image formed on the CCD sensor 14 deteriorates.

In the radiation detecting apparatus 50 shown in FIG. 8, the position of the objective lens 16 is adjusted so that fluorescence emitted from a position close to a side surface where radiation enters is imaged on the CCD sensor 14. In this case, fluorescence emitted from a position that is far from the side surface where radiation enters is formed at a position that is farther from the objective lens 16 than the position of the CCD sensor 14. Thereby, the resolution of the radiation detecting apparatus 50 deteriorates.

In the radiation detecting element 20 according to the present embodiment, scattering of light-emission points of fluorescence in the traveling direction of radiation can be prevented by reducing the thickness of the fluorescent screen 24. For example, by making the thickness of the fluorescent screen 24 1 µm, the spatial resolution of the radiation detecting element 20 can be made equal to the spatial resolution determined by the diffraction limit of fluorescence emitted by the fluorescent screen 24.

The spatial resolution and sensitivity of the radiation detecting apparatus 10 are in a trade-off relationship with the thickness of the fluorescent screen 24. When the thickness of the fluorescent screen 24 is small, the spatial resolution increases whereas the amount of emitted light of fluorescence is reduced. For example, if the thickness of the fluorescent screen 24 is 300 µm, 99.4% of a signal of an X-ray with photon energy of 10 KeV can be detected by the fluorescent screen. If the thickness of the fluorescent screen 24 is 20 µm, 29% of a signal of an X-ray with photon energy of 10 KeV can be detected by the fluorescent screen. If the thickness of the fluorescent screen 24 is 1 µm, 1.7% of a signal of an X-ray with photon energy of 10 KeV can be detected by the fluorescent screen. The problem of the detection ratio of an X-ray signal becoming low can be remedied by changing the material used for the fluorescent screen 24 to a material having a greater atomic number or a denser material.

Also, in the present embodiment, the surface of the fluorescent screen 24 where radiation enters is flattened highly accurately in the process of thinning the fluorescent screen 24 by CMP. Thereby, scattering of an entering radiation on the front surface of the fluorescent screen 24 can be suppressed, and the sensitivity and spatial resolution of the radiation detecting apparatus 10 can be increased.

Also, in the present embodiment, the thickness of the substrate 22 is 3 mm, which thickness attenuates radiation that has been transmitted through the fluorescent screen 24 and does not allow passage of the radiation. In a conventional apparatus, fluorescence is reflected on a mirror and allowed to enter the CCD sensor 14 for the purpose of preventing exposure of the objective lens 16 and the CCD sensor 14 to radiation. However, because in the present embodiment, radiation is extinguished at the substrate 22 having high radiation resistance, it does not reach the objective lens 16 or the CCD sensor 14. For this reason, the radiation detecting apparatus 10 according to the present embodiment can form an image of fluorescence on the CCD sensor 14 by using the objective lens 16 without providing a mirror. Thereby, the radiation detecting apparatus 10 can be downsized, the design freedom of the optical system of the radiation detecting apparatus 10 can be improved, and furthermore, cost reduction can be realized.

Furthermore, the objective lens 16 can be arranged close to the radiation detecting element 20 by not providing a mirror. Thereby, the working distance which is a distance between the objective lens 16 and the radiation detecting element 20 can be decreased, and the numerical aperture of the objective lens 16 can be increased. Thereby, the sensitivity and resolution of the radiation detecting apparatus 10 can be increased.

It should be noted that even in a radiation detecting apparatus in which a mirror is installed between the objective lens 16 and the CCD sensor 14 and the incident direction of fluorescence on the CCD sensor 14 is set to be vertical to the radiation incident direction, the radiation detecting element 20 according to the present embodiment can be used. Thereby, the width of the radiation detecting apparatus can be reduced. Furthermore, even when the working distance is increased in order to attain low magnification and wide viewing field of the radiation detecting apparatus, this can be realized, without increasing the width of the radiation detecting apparatus, by installing a mirror between the objective lens 16 and the CCD sensor 14 and making the incident direction of fluorescence toward the CCD sensor 14 vertical to the radiation incident direction.

Also, in the present embodiment, the thickness of the substrate 22 is decreased as much as possible while ensuring that radiation transmitted through the fluorescent screen 24 is not transmitted through the substrate 22. When the substrate 22 is made thin, because the optical path within the substrate 22 through which fluorescence emitted from the fluorescent screen 24 is transmitted becomes short, the spherical aberration due to the substrate 22 can be reduced. Because the spherical aberration causes blurring and distortion in an image formed, the resolution of the radiation detecting apparatus 10 can be increased by reducing the spherical aberration. Furthermore, for example, the spherical aberration can be corrected by providing a correction collar to the objective lens 16. It should be noted that the spherical aberration can be completely corrected by a commercially available objective lens with a correction collar by making the substrate 22 about 500 µm or smaller. Also, the substrate 22 can be thinned up to 300 µm only by means of normal mechanical processing/polishing.

Furthermore, the objective lens 16 can be brought close to the radiation detecting element 20 by making the substrate 22 thin. By further decreasing the working distance, the numerical aperture of the objective lens 16 can be further increased. Thereby, the sensitivity and resolution of the radiation detecting apparatus 10 can be further increased.

Also, because the anti-reflection film 26 is provided in the present embodiment, fluorescence emitted from the fluorescent screen 24 can be prevented from being reflected at the interface between the substrate and the air.

Furthermore, fluorescence emitted from the fluorescent screen 24 in a direction in which radiation enters can be prevented from being reflected at the interface between the fluorescent screen 24 and the air by providing the anti-reflection film 28. The reflected light becomes components that are not focused on the CCD sensor 14, and the resolution deteriorates thereby. For this reason, by providing at least one of the anti-reflection film 26 and the anti-reflection film 28, occurrence of the reflected light can be suppressed, and deterioration of the resolution of the radiation detecting apparatus 10 can be suppressed.

Figure 9:
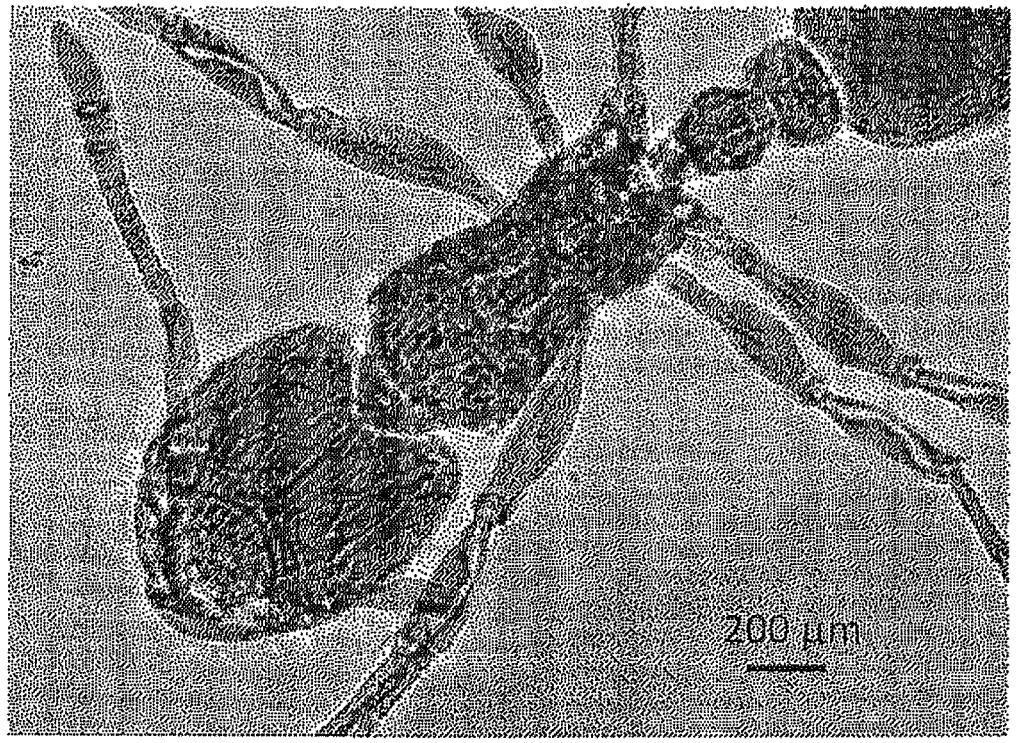
FIG. 9 shows an example of an image captured with the radiation detecting apparatus 10.

FIG. 9 shows an example of an image captured with the radiation detecting apparatus 10. The image shown in FIG. 9 is an X-ray photograph of an ant captured by using the radiation detecting apparatus 10 that comprises the radiation detecting element 20 in which the fluorescent screen 24 of 10-µm thickness and the substrate of 2.990-mm thickness are bonded by solid state diffusion. The radiation detecting apparatus 10 has the spatial resolution of 8 µm. The X-ray photograph of the ant is captured by using a one-time 2-mm square beam of SPring-8. Background image difference processing and standardization processing of X-ray intensity in the unit of pixel have been performed on the image that was captured and generated. It can be seen in the X-ray photograph of the ant shown in FIG. 9 that the radiation detecting apparatus 10 can capture an image of the appearance of the feelers, skeleton structure inside feet, and internal organs of the abdominal region of the ant at a high contrast.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A manufacturing method of a radiation detecting element comprising:

bonding, by solid state diffusion, a substrate transparent to visible light and a fluorescent screen that emits fluorescence in response to radiation by a dopant added to a material that is the same as a material of the substrate; and thinning the fluorescent screen, wherein the bonding includes applying pressure to the substrate and the fluorescent screen.

2. The manufacturing method according to claim 1, wherein, the bonding includes applying pressure to the substrate and the fluorescent screen in the bonding directions of the substrate and the fluorescent screen.

3. The manufacturing method according to claim 1, wherein the thinning includes polishing the fluorescent screen.

4. The manufacturing method according to claim 1, wherein the bonding is performed after a bonding surface of the substrate is superposed on a bonding surface of the fluorescent screen.

* * * * *